(12) United States Patent
Doering et al.

(10) Patent No.: US 9,145,123 B2
(45) Date of Patent: Sep. 29, 2015

(54) METHODS AND SYSTEMS FOR CONTROLLING CATALYST TEMPERATURE

(71) Applicant: Ford Global Technologies, LLC, Dearborn, MI (US)

(72) Inventors: Jeffrey Allen Doering, Canton, MI (US); Alex O'Connor Gibson, Ann Arbor, MI (US); Dennis Craig Reed, Dexter, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 13/964,982

(22) Filed: Aug. 12, 2013

(65) Prior Publication Data
US 2015/0045185 A1    Feb. 12, 2015

(51) Int. Cl.
| | |
|---|---|
| *F16H 59/00* | (2006.01) |
| *B60W 10/02* | (2006.01) |
| *B60W 10/06* | (2006.01) |
| *F01N 11/00* | (2006.01) |
| *B60W 20/00* | (2006.01) |
| *B60K 6/48* | (2007.10) |

(52) U.S. Cl.
CPC ............... *B60W 10/06* (2013.01); *B60W 10/02* (2013.01); *B60W 20/1082* (2013.01); *F01N 11/002* (2013.01); *B60K 2006/4825* (2013.01); *B60W 2510/068* (2013.01); *B60W 2510/0657* (2013.01); *B60W 2510/0676* (2013.01); *B60W 2530/12* (2013.01); *B60W 2710/0605* (2013.01); *B60W 2710/0627* (2013.01); *B60W 2710/0633* (2013.01); *B60W 2710/0694* (2013.01)

(58) Field of Classification Search
CPC  B60W 10/02; B60W 10/06; B60W 2510/068
USPC .................................. 477/5, 98, 174; 701/67
See application file for complete search history.

(56) References Cited

U.S. PATENT DOCUMENTS

| | | | |
|---|---|---|---|
| 6,886,649 B2 | 5/2005 | Wakashiro et al. | |
| 6,935,989 B2 * | 8/2005 | Shibagaki | ........................ 477/98 |
| 7,055,312 B2 * | 6/2006 | Osawa et al. | .................... 60/285 |
| 8,784,264 B2 * | 7/2014 | Gibson et al. | .................... 477/76 |
| 8,904,754 B2 * | 12/2014 | Sasaki | .............................. 60/274 |
| 2004/0050036 A1 * | 3/2004 | Ueda et al. | ....................... 60/285 |
| 2004/0060535 A1 | 4/2004 | Osawa et al. | |
| 2009/0043437 A1 * | 2/2009 | Shiino | ............................. 701/22 |
| 2009/0118091 A1 | 5/2009 | Lahti et al. | |

* cited by examiner

*Primary Examiner* — Robert Hodge
*Assistant Examiner* — Tinh Dang
(74) *Attorney, Agent, or Firm* — David Kelley; Alleman Hall McCoy Russell & Tuttle LLP

(57) ABSTRACT

Systems and methods for improving operation of a hybrid vehicle are presented. In one example, operation of a driveline disconnect clutch is based on temperature conditions of a catalyst. The driveline disconnect clutch may not be opened if catalyst temperature is greater than a threshold temperature so that the catalyst may be cooled.

15 Claims, 4 Drawing Sheets

METHODS AND SYSTEMS FOR CONTROLLING CATALYST TEMPERATURE

FIELD

The present description relates to a system and methods for controlling a temperature of a catalyst of a hybrid vehicle. The methods may be particularly useful for hybrid vehicles that include a driveline with a disconnect clutch where an engine may rotate with or without being connected to a remaining portions of a driveline.

BACKGROUND AND SUMMARY

A hybrid vehicle driveline may include a driveline disconnect clutch. The driveline disconnect clutch allows a motor in the hybrid driveline to operate independently from an engine in the hybrid driveline. During periods of low demand torque, the motor may operate while then engine is stopped and disconnected from the motor via the driveline disconnect clutch. By opening the driveline disconnect clutch, the motor may propel the hybrid vehicle more efficiently because the motor does not have to overcome engine pumping losses and engine friction. However, if the engine is stopped after operating at a higher load, a catalyst in the engine's exhaust system may reach temperatures that accelerate catalyst degradation. In particular, if the fuel supplied to the engine is cut-out and a small amount of air is allowed to flow to the catalyst before the engine has stopped rotating, hydrocarbons may combust and raise catalyst temperature higher than may be desired.

The inventors herein have recognized the above-mentioned disadvantages and have developed a method for operating a hybrid driveline, comprising: in response to a catalyst temperature exceeding a first threshold temperature and conditions, other than catalyst conditions, being present for opening a driveline disconnect clutch, not opening the driveline disconnect clutch.

By selectively allowing opening of a driveline disconnect clutch based on catalyst state, it may be possible to provide the technical result of reducing the possibility of catalyst degradation after catalyst temperature has been elevated. For example, if an engine has been operated at higher speeds and loads, catalyst temperature may become elevated. However, when engine load is reduced, the driveline disconnect clutch may remain engaged while lower engine exhaust temperatures cool the catalyst. Additionally, by leaving the driveline disconnect clutch closed, driveline torque disturbances may also be reduced since the driveline remains in a same operating state.

The present description may provide several advantages. In particular, the approach may reduce the possibility of catalyst degradation. Further, the approach may reduce driveline torque disturbances. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
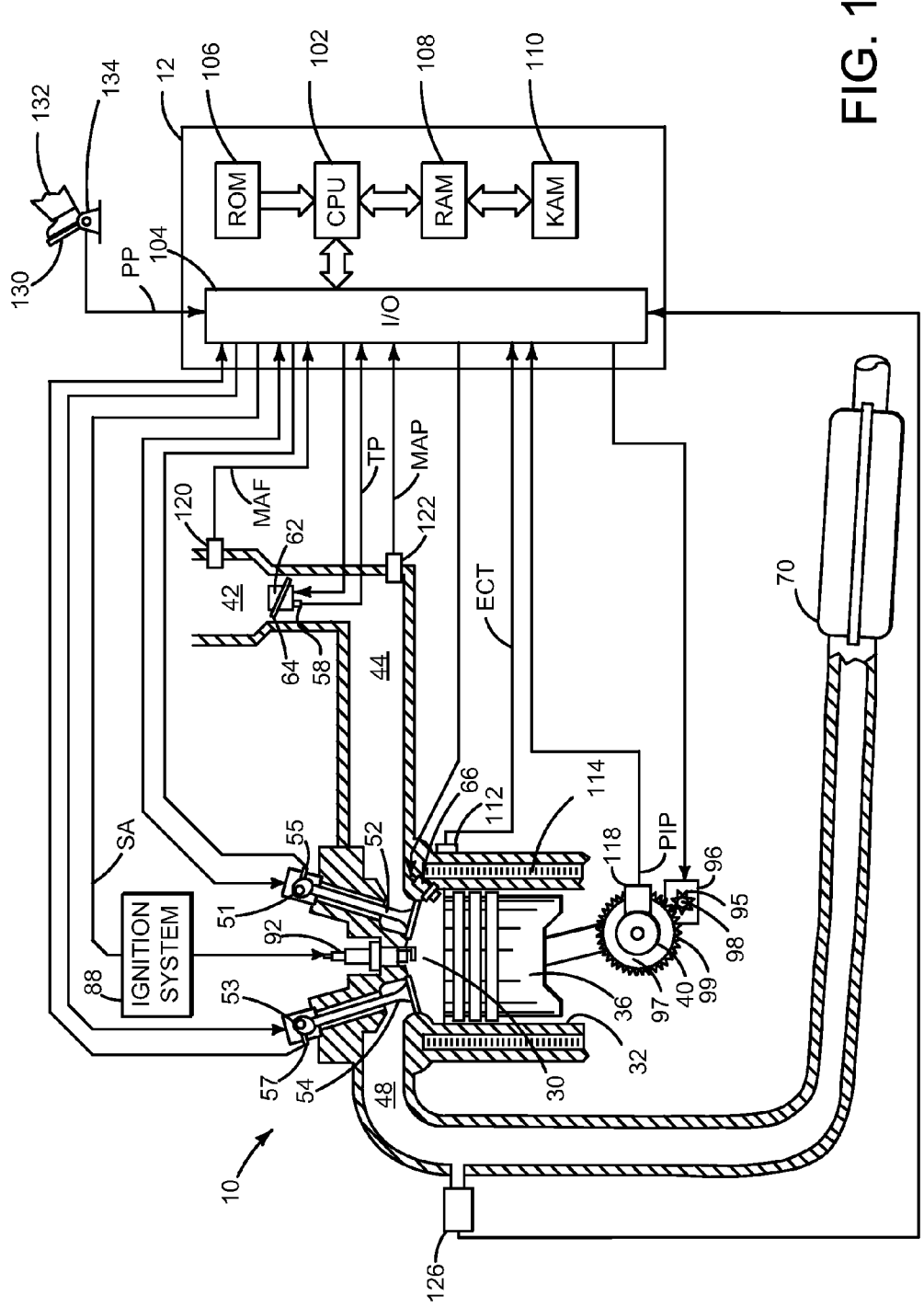
FIG. 1 is a schematic diagram of an engine.
Figure 2:
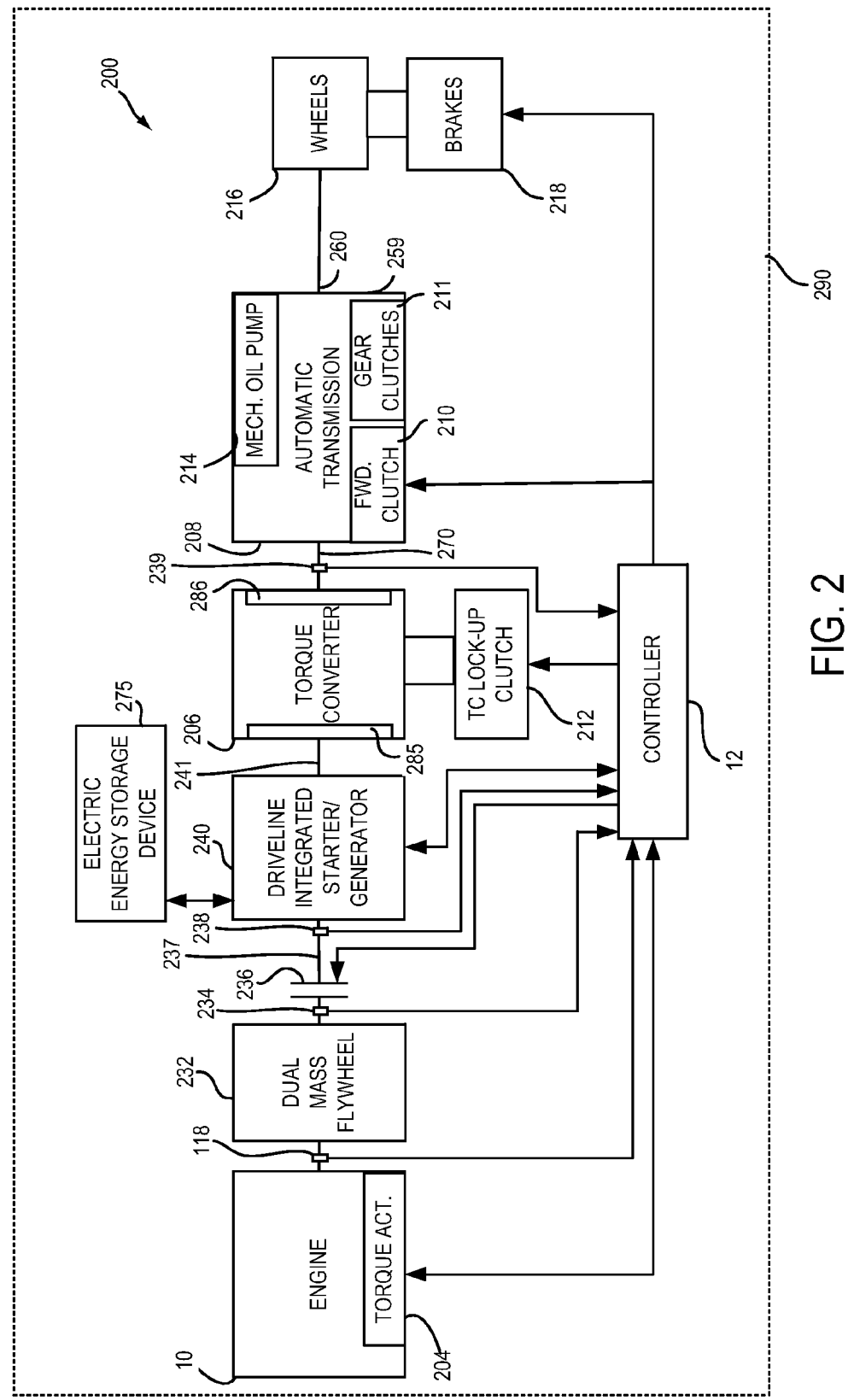
FIG. 2 is shows an example vehicle driveline configuration.
Figure 3:
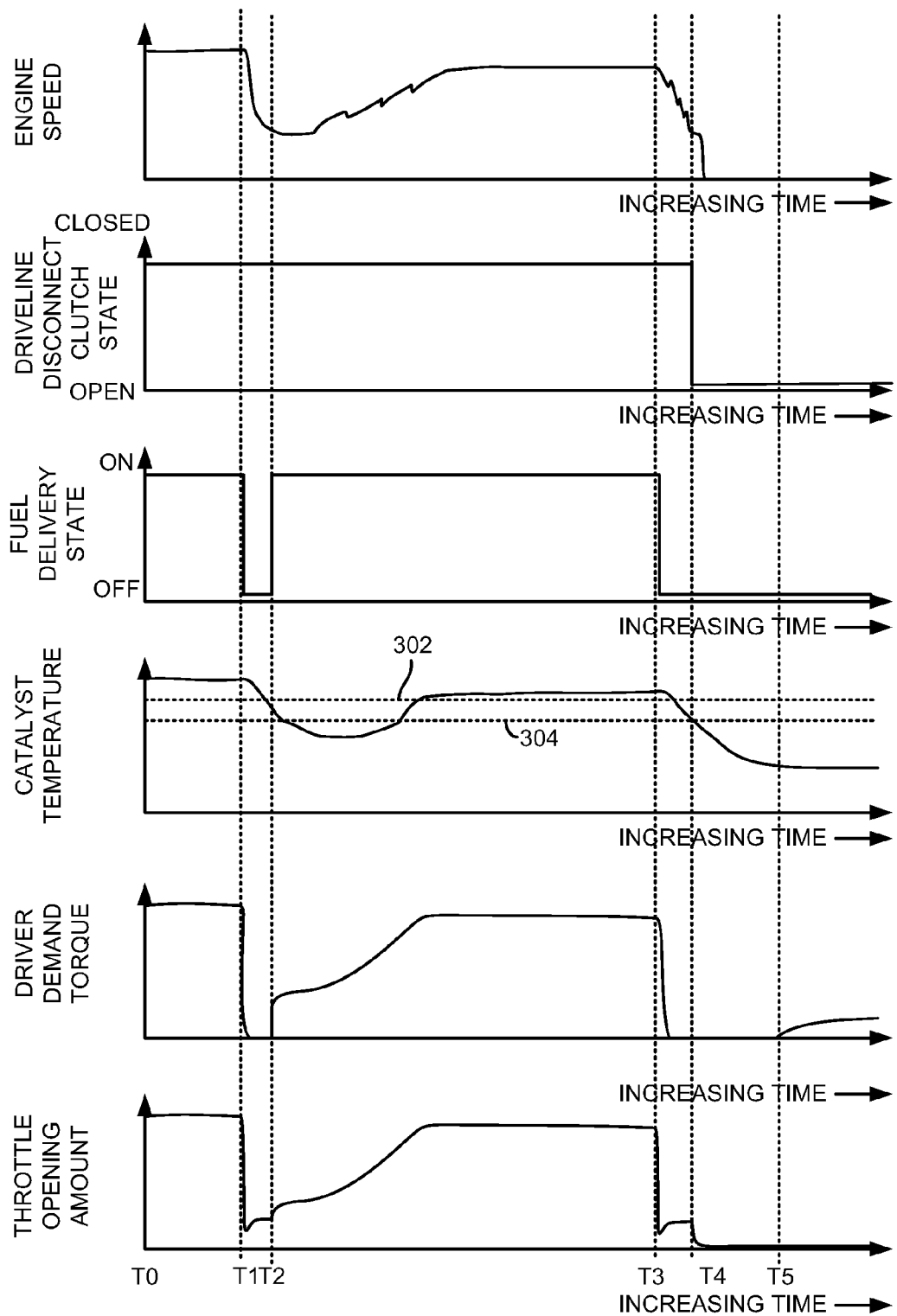
FIG. 3 shows a prophetic vehicle operating sequence.

The present description is related to controlling driveline operation for a hybrid vehicle. The hybrid vehicle may include an engine and a driveline integrated starter/generator (DISG) or electric machine (e.g., motor/generator) as shown in FIGS. 1-2. The engine may be operated with or without the DISG during vehicle operation via a driveline disconnect clutch. The DISG is integrated into the driveline on the same axis as the engine crankshaft and rotates whenever a transmission torque converter impeller rotates. Further, the DISG may not be selectively engaged or disengaged from the driveline. Rather, the DISG is an integral part of the driveline. Further still, the DISG may be operated with or without operating the engine. The driveline may be operated as shown in the sequence of FIG. 3 according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. A temperature of catalytic converter 70 may be measured or estimated via engine speed, engine load, engine coolant temperature, and spark timing.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, cylinder deactivation mechanism, valve lift adjustment, cam phase adjuster, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

Thus, the system of FIG. 1 provides for a hybrid vehicle system, comprising: an engine including an exhaust system having a catalyst; a motor selectively coupled to the engine via a driveline disconnect clutch; and a controller including non-transitory instructions executable to selectively stop the driveline disconnect clutch from opening in response to a state of the catalyst. The hybrid vehicle system further comprises additional instructions to open the driveline disconnect clutch in response to a temperature of the catalyst being less than a threshold temperature.

In another example, the hybrid vehicle system further comprises additional instructions to cut-out fuel flow to the engine in response to driver demand torque being less than a threshold torque. The hybrid vehicle system further comprises additional instructions to increase air flow through the engine in response to the state of the catalyst. The hybrid vehicle system further comprises additional instructions to open the driveline disconnect clutch in response to a temperature of the catalyst being less than a threshold temperature. The hybrid vehicle system further comprises additional instructions to reduce a temperature of the catalyst in response to a capacity of a driveline integrated starter/generator to provide a desired driver demand torque.

Referring now to FIG. 3, an example driveline operating sequence is shown. The sequence of FIG. 3 may be provided via the system of FIGS. 1 and 2 executing instructions stored in non-transitory memory according to the method of FIG. 4. The sequence of FIG. 3 shows vertical markers T0-T5 which indicate particular times of interest during the operating sequence. All plots in FIG. 3 are referenced to the same time scale and occur at the same time.

The first plot from the top of FIG. 3 is a plot of engine speed versus time. In particular, the X axis represents time and time begins at the left side of FIG. 3 and increases to the right side of FIG. 3. The Y axis represents engine speed and engine speed increases in the direction of the Y axis arrow.

The second plot from the top of FIG. 3 is a plot of driveline disconnect clutch state versus time. The X axis represents time and time begins at the left side of FIG. 3 and increases to the right side of FIG. 3. The Y axis represents driveline disconnect clutch state. The driveline disconnect clutch is open when the driveline disconnect state trace is at a lower level. The driveline disconnect clutch is closed when the driveline disconnect clutch state trace is at a higher level.

The third plot from the top of FIG. 3 is a plot of fuel delivery state versus time. The X axis represents time and time begins at the left side of FIG. 3 and increases to the right side of FIG. 3. The Y axis represents fuel deliver state and the fuel supply is on and delivering fuel to the engine when the fuel delivery state trace is at a higher level. The fuel supply is off and not delivering fuel to the engine when the fuel delivery state trace it at a lower level.

The fourth plot from the top of FIG. 3 is a plot of catalyst temperature versus time. The X axis represents time and time begins at the left side of FIG. 3 and increases to the right side of FIG. 3. The Y axis represents catalyst temperature and catalyst temperature increases in the direction of the Y axis arrow. Horizontal line 302 represents a first threshold catalyst temperature. Horizontal line 304 represents a second threshold catalyst temperature.

The fifth plot from the top of FIG. 3 is a plot of driver demand torque versus time. The X axis represents time and time begins at the left side of FIG. 3 and increases to the right side of FIG. 3. The Y axis represents driver demand torque and driver demand torque increases in the direction of the Y axis arrow. In one example, driver demand torque is determined from a position of an accelerator pedal. In other examples, driver demand torque may be determined by a controller.

The sixth from the top of FIG. 3 is a plot of engine throttle position versus time. The X axis represents time and time begins at the left side of FIG. 3 and increases to the right side of FIG. 3. The Y axis represents engine throttle position and engine throttle opening amount increases in the direction of the Y axis arrow.

At time T0, the engine speed and driver demand torque are at higher levels. The engine throttle position indicates that the throttle is opened a relatively large amount. The catalyst temperature is also at a higher level and it is greater than the first threshold level 302. The driveline disconnect clutch is closed so that the engine is coupled to the DISG and fuel is being supplied to the engine indicating that the engine is combusting air and fuel mixtures.

At time T1, the driver demand torque is reduced in response to a driver releasing an accelerator pedal (not shown). The throttle also closes in response to the driver releasing the accelerator pedal. The driveline disconnect clutch remains in an closed state since the driveline disconnect clutch is not allowed to open when catalyst temperature is greater than the first threshold temperature 302 even though vehicle conditions other than catalyst conditions are present to allow opening of the driveline disconnect clutch and stopping of the engine. For example, the driver demand torque is at a lower level such that the DISG may supply the desired driver demand torque. However, since catalyst temperature is greater than the first threshold temperature 302, the driveline disconnect clutch is not allowed to close. The engine speed is at the higher level and the fuel remains active at the time the when the driver demand torque is reduced Between time T1 and time T2, engine speed begins to go lower and the fuel supply is cut-out from supplying fuel to the engine cylinder. The fuel supply may be cut-out from the engine via ceasing to inject fuel to the engine via injectors. The throttle opening amount increases after decreasing so as to increase engine air flow and supply cool air to the catalyst to accelerate catalyst temperature reduction. The engine air amount is increased to a level that cools the catalyst rather than supplying oxygen to oxidize hydrocarbons and CO in the catalyst. The driveline disconnect clutch remains engaged and catalyst temperature moves lower, but it remains above the second threshold temperature 304.

In this way, fuel consumption may be reduced while the catalyst temperature is being reduced. Further, torque disturbances to the driveline may be reduced since the driveline disconnect clutch remains closed.

At time T2, the driver demand torque is increased in response to a driver applying an accelerator pedal. The throttle opening amount also increases in response to the increasing driver demand torque. The driver demand torque is at a level that is greater than the capacity of the DISG so engine combustion is reactivated. The engine exits deceleration fuel cut-out and begins to combust air-fuel mixtures as indicated by the fuel delivery state transitioning from off to on. The driveline disconnect clutch remains in a closed state and engine speed increases as engine torque is provided to the driveline. The catalyst temperature levels off.

Between time T2 and time T3, the driver demand torque continues to increase and the catalyst temperature increases to a level greater than the first threshold temperature 302. The driveline disconnect clutch remains closed and fuel is supplied to the engine as indicated by the fuel delivery state. The engine throttle position and throttle opening amount follow the driver demand torque.

At time T3, the driver demand torque is reduced in response to the driver releasing the accelerator pedal (not shown). The engine throttle opening amount is also reduced as indicated by the throttle opening amount. The catalyst temperature is greater than first threshold temperature 302 and the fuel delivery state is on indicating that the engine is combusting air-fuel mixtures. The driveline disconnect clutch is closed so that the engine is providing torque to the driveline and engine speed is at an elevated level.

Between time T3 and time T4, the driver demand torque is reduced to zero and the fuel flow to the engine is cut-out. The throttle opening amount is also reduced and then opened a small amount to allow the engine to pump air from the engine intake system to the catalyst while fuel flow to the engine is stopped. The catalyst temperature is reduced as air is pumped through the engine to the catalyst. The driveline disconnect clutch remains closed and is not allowed to open even though conditions other than catalyst conditions are in states to provide for opening the driveline disconnect clutch. The driveline disconnect clutch remains closed because the catalyst temperature remains above the second threshold temperature 304.

At time T4, the catalyst temperature is reduced to a temperature below the second threshold temperature 304. The driveline disconnect clutch opens in response to the catalyst temperature being less than the second threshold temperature 304. The engine throttle opening amount is reduced so that the catalyst retains more heat energy. The engine also stops rotating soon after the driveline disconnect clutch is opened since the engine is not receiving fuel as indicated by the fuel delivery state being at the lower level. The driver demand torque remains at zero (e.g., the X axis level).

At time T5, the driver demand torque increases and the throttle remains closed. The engine also remains stopped since the DISG has sufficient capacity to provide the desired driver demand torque. Fuel delivery to the engine remains stopped and the driveline disconnect clutch remains in an open state. The catalyst temperature is slowly reduced as time goes on and the engine is not combusting air-fuel mixtures.

Accordingly, the driveline disconnect clutch may be selectively opened in response to catalyst temperature. By leaving the driveline disconnect clutch closed, heat may be extracted from the catalyst so that the possibility of catalyst degradation may be reduced before engine rotation stops. Further, the engine throttle may be controlled responsive to the catalyst temperature to increase or decrease catalyst temperature depending on the catalyst temperature.

Figure 4:
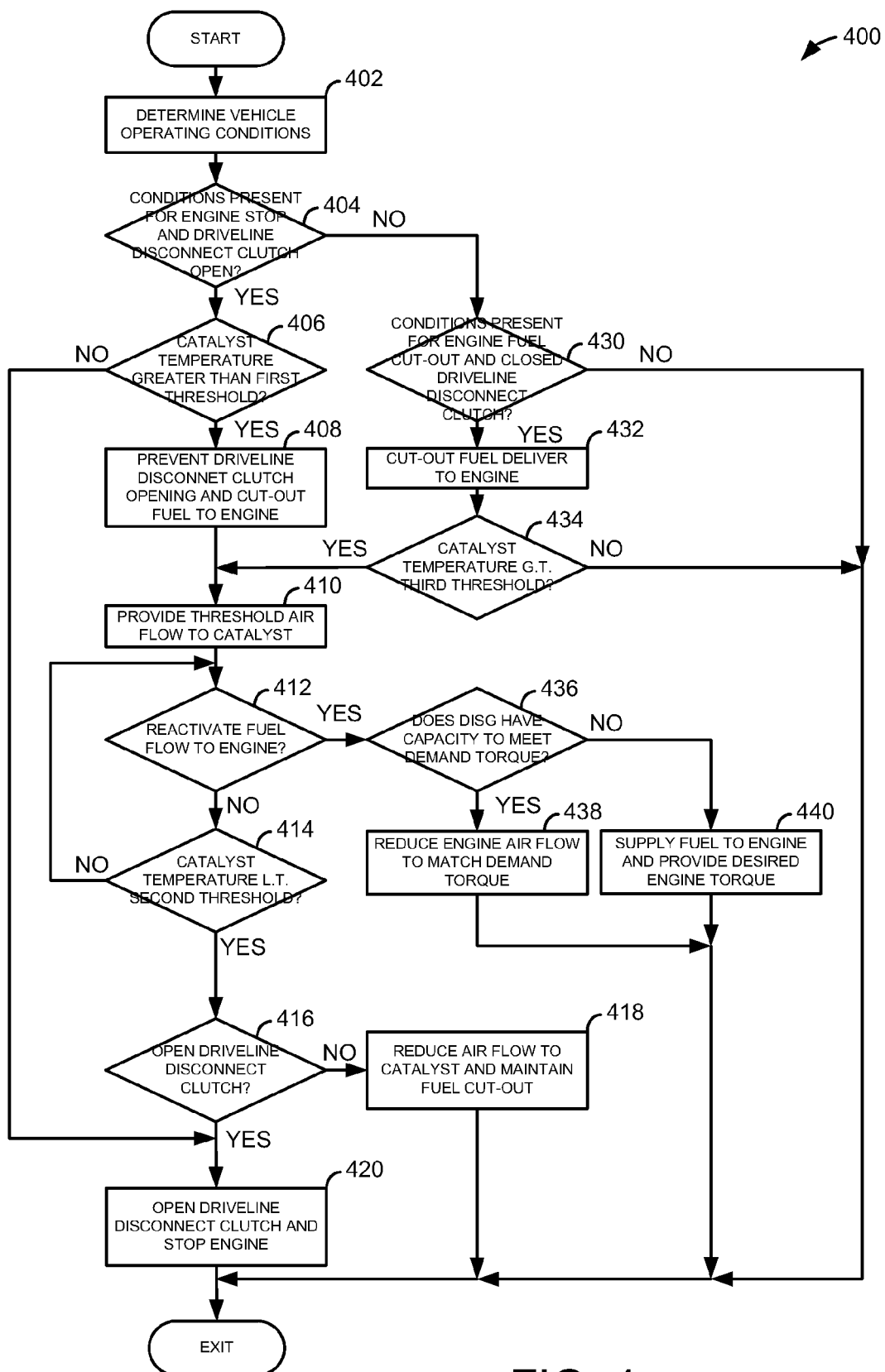
FIG. 4 is a flowchart showing one example method for operating an engine.

Referring now to FIG. 4, a method for operating an engine and driveline of a hybrid vehicle is shown. The method of FIG. 4 may be stored as executable instructions in non-transitory memory of a controller such as controller 12 in FIG. 1. Thus, the method of FIG. 4 may be incorporated in to a system as shown in FIGS. 1 and 2. The method of FIG. 4 may also provide the sequence shown in FIG. 3.

At 402, method 400 determines vehicle operating conditions. Vehicle operating conditions may include but are not limited to vehicle speed, driveline disconnect clutch state (e.g., open or closed), engine speed, catalyst temperature, driver demand torque, and fuel delivery state. Catalyst temperature may be measured or inferred from engine speed, engine load, spark timing, engine air-fuel ratio, and engine coolant temperature. Driver demand torque may be determined via a position of an accelerator pedal. Fuel delivery state may be determined based on whether or not fuel injectors are enabled. Method 400 proceeds to 404 after operating conditions are determined.

At 404, method 400 judges whether or not conditions other than catalyst state conditions are present for stopping engine rotation and opening the driveline disconnect clutch. Conditions for judging when to stop engine rotation and open the driveline disconnect clutch may include but are not limited to vehicle speed, driver demand torque, engine temperature, and vehicle brake application state. For example, a request for stopping engine rotation and opening the driveline disconnect clutch may be made when vehicle speed is below a threshold speed and when driver demand torque is less than a threshold driver demand torque. Further, another condition for judging whether or not to stop the engine and open the driveline disconnect clutch may be the throttle opening amount. If the throttle opening amount is not less than a threshold opening amount, method 400 may judge conditions are not present for stopping the engine and opening the driveline disconnect clutch. If method 400 judges that conditions other than catalyst conditions are not present to stop engine rotation and open the driveline disconnect clutch, the answer is no and method 400 proceeds to 430. If method 400 judges that conditions other than catalyst conditions are present for stopping engine rotation and opening the driveline disconnect clutch, the answer is yes and method 400 proceeds to 406.

At 430, method 400 judges whether or not conditions for engine fuel cut-out (e.g., stopping fuel flow to the engine) are present while the driveline disconnect clutch is closed. In one example, the fuel may be cut-out from the engine when the driveline disconnect clutch is closed when driver demand torque is less than a threshold torque and vehicle speed is greater than a threshold speed. Further, the engine speed may be required to be greater than a threshold engine speed for fuel cut-out to be activated, thereby stopping fuel flow to the engine. If method 400 judges that conditions are present for activating fuel cut-out, the answer is yes and method 400 proceeds to 432. Otherwise, the answer is no and method 400 exits.

At 432, method 400 activates fuel cut-out and combustion within engine cylinders ceases while the engine continues to rotate. During fuel cut-out the fuel injectors and the fuel pump may be deactivate to off states. Method 400 proceeds to 434 after fuel cut-out is activated.

At 434, method 400 judges whether or not catalyst temperature is greater than a third threshold temperature. In one example, the third threshold temperature may be greater than first and second threshold temperatures described later in method 400. Catalyst temperature may be measured or inferred from engine speed, engine air-fuel ratio, engine spark timing, engine load, and engine temperature. If method 400 judges that catalyst temperature is greater than the third threshold temperature, the answer is yes and method 400 proceeds to 410. Otherwise, the answer is no and method 400 proceeds to exit.

It should be noted that fuel cut-out may be deactivated in response to an increase in driver demand torque, engine speed being less than a threshold speed, catalyst temperature being less than a fourth threshold temperature or other conditions. For example, fuel injection to the engine may resume when engine speed is less than a threshold speed so that engine speed stays above an idle speed.

At 406, method 400 judges whether or not a temperature of a catalyst in the engine's exhaust path is greater than a first threshold temperature. The first threshold temperature may be greater than the second threshold temperature mentioned at 414 and less than the third threshold temperature mentioned at 434. If method 400 judges that the catalyst temperature is greater than the first threshold temperature, the answer is yes and method 400 proceeds to 408. Otherwise, the answer is no and method 400 proceeds to 420.

At 408, method 400 prevents or stops the driveline disconnect clutch from opening in response to conditions other than catalyst conditions. For example, if the driveline disconnect clutch is requested to open based on driver demand torque and vehicle speed, the driveline disconnect clutch is not allowed to open based on the catalyst temperature being greater than the first threshold temperature.

Method 400 also activates fuel cut-out at 408. Fuel cut-out may be activated via stopping fuel flow through fuel injectors. The vehicle's fuel pump may also be deactivated in response to entering fuel cut-out mode. Method 400 proceeds to 410 after fuel cut-out is activated and the driveline disconnect clutch is held open.

At 410, method 400 provides a threshold engine air flow to the catalyst. In one example, the threshold air flow provided to the catalyst via the engine is empirically determined and stored in memory of controller 12 as shown in FIG. 1. For example, if catalyst temperature is much greater than the first threshold temperature, the engine air flow may be adjusted to a first flow rate. If catalyst temperature is close to the first threshold temperature, the engine air flow may be adjusted to a second flow rate that is lower than the first flow rate.

The engine air flow rate may be adjusted via adjusting a position of a throttle. If it is desired to increase engine air flow, the throttle may be opened further. If it is desired to decrease engine air flow, the throttle may be closed further. By increasing air flow to the catalyst, the catalyst may be cooled at a faster rate. Further, increases in catalyst temperature due to excess oxygen in the catalyst may be reduced via lowering temperature of gases entering the catalyst and increasing the mass flow rate of gas (e.g., air) through the catalyst. Method 400 proceed to 412 after the engine air flow rate is increased.

At 412, method 400 judges whether or not to reactivate fuel flow to the engine. In one example, fuel flow to the engine may be reactivated in response to driver demand torque exceeding a threshold torque. Additionally, other conditions may be used to determine if fuel flow to the engine is to be reactivated. For example, fuel flow may be reactivated in response to vehicle speed and/or engine speed. If method 400 judges to reactivate fuel flow to the engine, the answer is yes and method 400 proceeds to 436. Otherwise, the answer is no and method 400 proceeds to 414.

At 436, method 400 judges whether or not the DISG has the torque capacity to meet the driver demand torque. In one example, the driver demand torque is a torque at an impeller of a torque converter. Thus, the driver demand torque may be provided in part via an engine, and the remaining torque may be provided by the DISG. For example, if a DISG has 100

N-m of torque capacity (e.g., a maximum amount of torque the DISG may provide to a driveline) and the driver demand torque is 55 N-m, the answer is yes. If method 400 judges that the DISG has the capacity to provide the desired torque, the answer is yes and method 400 proceeds to 438. Otherwise, the answer is no and method 400 proceeds to 440.

At 440, method 400 supplies fuel and spark to the engine. The engine begins combusting air and fuel mixtures and the engine throttle is adjusted so that the engine provides a desired portion of the driver demand torque (e.g., from 0 to 100%). Method 400 proceeds to exit after the engine is reactivated and providing torque to the driveline.

At 438, method 400 reduces engine air flow to match a desired engine demand torque at the present rotational speed of the engine and the DISG. In particular, the engine air flow is reduced from the level used to provide air to the catalyst to an amount of air that allows the engine to rotate at its present speed when combusting a stoichiometric air-fuel ratio. In other words, engine air amount may be adjusted to a level that provides a desired engine torque amount that keeps the engine rotating at the speed of the DISG without adding significant torque to the driveline (e.g., greater than 40 N-m). In this way, engine fuel consumption may remain low while the DISG supplies torque to the driveline. Further, by reactivating the engine, the engine and DISG may respond more quickly to a further increase in driver demand torque. Method 400 proceeds to exit after the engine air flow is reduced.

At 414, method 400 judges whether or not a temperature of the catalyst is less than the second threshold catalyst temperature. The second threshold catalyst temperature being less than the first and third threshold temperatures. If method 400 judges that the catalyst temperature is less than the third threshold temperature, the answer is yes and method 400 proceeds to 416. Otherwise, the answer is no and method 400 returns to 412.

At 416, method 400 judges whether or not to open the driveline disconnect clutch. Since catalyst temperature is less than the second threshold temperature the driveline disconnect clutch may be opened, but opening the driveline disconnect clutch is not required. In one example, the driveline disconnect clutch may be opened if the driver demand torque remains below a threshold torque and if the amount of oxygen stored in catalyst is less than a threshold amount (e.g., in a range of 50-75% of the catalyst's oxygen storage capacity). On the other hand, the driveline disconnect clutch may not be opened if the oxygen state of the catalyst is greater than the threshold amount. If the amount of oxygen stored in the catalyst is greater than the threshold amount, fuel may be supplied to the engine without spark so that the engine discharges the fuel to the catalyst. In this way, the catalyst oxygen state may be adjusted in preparation for an engine restart. If method 400 judges to open the driveline disconnect clutch, the answer is yes and method 400 proceeds to 420. Otherwise, the answer is no and method 400 proceeds to 418.

At 418, method 400 reduces air flow to the catalyst and maintains fuel cut-out. Thus, air flow through the engine is reduced and the engine does not combust an air-fuel mixture or eject fuel to the catalyst. The engine air flow may be reduced via partially closing the engine throttle and/or adjusting engine valve timing. Method 400 proceeds to exit after engine air flow is reduced.

At 420, method 400 opens the driveline disconnect clutch and the engine decelerates to stop rotating. The driveline may open in a step like manner or it may gradually open so that engine stopping position may be controlled. Method 400 proceeds to exit after the driveline disconnect clutch is opened.

Thus, the method of FIG. 4 provides for operating a hybrid driveline, comprising: in response to a catalyst temperature exceeding a first threshold temperature and conditions, other than catalyst conditions, being present for opening a driveline disconnect clutch, not opening the driveline disconnect clutch. The method further comprises cutting-off fuel to an engine in response to vehicle operating conditions. The method further comprises increasing an opening amount of a throttle of the engine in response to cutting-off fuel flow to the engine and the catalyst temperature. The method further comprises opening the driveline disconnect clutch in response to the catalyst temperature being less than a second threshold temperature.

In some examples, the method further comprises decreasing the opening amount of the throttle of the engine in response to the catalyst temperature being less than a second threshold temperature without opening the driveline disconnect clutch. The further comprises continuing to combust air-fuel mixtures in an engine. The method also includes where the driveline disconnect clutch is positioned in the hybrid driveline between an engine and a driveline integrated starter/generator.

In another example, the method of FIG. 4 provides for operating a hybrid driveline, comprising: in response to a catalyst temperature exceeding a first threshold temperature and conditions, other than catalyst conditions, being present for opening a driveline disconnect clutch, not opening the driveline disconnect clutch; opening the driveline disconnect clutch and stopping rotation of an engine in response to the catalyst temperature being less than a second threshold temperature; and cutting-off fuel flow to the engine in response to the catalyst exceeding a third threshold temperature and the conditions for opening the driveline disconnect clutch not being present.

In one example, the method further comprises increasing air flow through the engine and cutting off fuel flow to the engine in response to vehicle operating conditions. The method further comprises reducing engine air flow in response to a request to reactivate fuel flow to the engine after cutting off fuel flow to the engine. The method includes where the engine air flow is reduced in response to capacity of a driveline integrated starter/generator to supply a driver demand torque. The method further comprises increasing engine air flow in response to the catalyst exceeding the third threshold temperature. The method further comprises reactivating fuel flow to the engine after cutting off fuel flow to the engine in response to an increasing driver demand torque. The method further comprises stopping rotation of the engine and opening the driveline disconnect clutch in response to conditions, other than catalyst conditions, being present for opening a driveline disconnect clutch and catalyst temperature being less than the first threshold temperature.

Additionally, the method of FIG. 4 provides for a method for operating a hybrid driveline, comprising: during a first engine operating mode with desired engine torque/power below a threshold torque/power and a catalyst temperature above an upper temperature limit, maintaining a driveline disconnect clutch engaged; and during a second engine operating mode, different from the first operating mode, with desired engine torque/power below the threshold torque/power and the catalyst temperature below the upper limit, opening the driveline disconnect clutch. The method further comprises where the driveline disconnect clutch is maintained engaged until the catalyst temperature is less than a catalyst threshold temperature. The method further comprises automatically stopping engine rotation in the engine in the second mode.

In some examples, the method further comprises continuing to rotate the engine and stopping fuel flow to the engine in the first mode. The method further comprises increasing engine air flow in the first mode. The method further comprises decreasing engine air flow after the catalyst temperature reduced to less than a threshold temperature. The method further comprises reactivating fuel flow to the engine in response to a driver demand torque and reducing engine air flow in response to a driveline integrated starter/alternator having capacity to provide the driver demand torque.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a hybrid driveline, comprising:
not opening the driveline disconnect clutch in response to a catalyst temperature exceeding a first threshold temperature during conditions where the driveline disconnect clutch opens when the catalyst temperature is less than the first threshold temperature;
cutting-off fuel to an engine via a fuel injector in the hybrid driveline in response to a driver demand torque while the catalyst temperature exceeds the first threshold temperature;
increasing opening of a throttle via an electronic throttle of the engine in response the catalyst temperature exceeding the first threshold temperature and cutting-off fuel to the engine; and
opening the driveline disconnect clutch via the controller in response to the catalyst temperature being less than a second threshold temperature.

2. The method of claim 1, further comprising decreasing the engine air flow via cam timing, valve lift, cylinder deactivation, or opening amount of the throttle of the engine in response to a request to reactivate fuel flow to the engine.

3. The method of claim 1, where the driveline disconnect clutch is positioned in the hybrid driveline between an engine and a driveline integrated starter/generator.

4. A method for operating a hybrid driveline, comprising:
during a first engine operating mode with engine desired torque/power below a threshold torque/power and a catalyst temperature above an upper temperature threshold, maintaining a driveline disconnect clutch engaged; and
during a second engine operating mode, different from the first operating mode, with engine desired torque/power below the threshold torque/power and the catalyst temperature below the upper threshold, opening the driveline disconnect clutch.

5. The method of claim 4, further comprising where the driveline disconnect clutch is maintained engaged until the catalyst temperature is less than a catalyst threshold temperature.

6. The method of claim 5, further comprising automatically stopping engine rotation in the engine in the second mode.

7. The method of claim 5, further comprising continuing to rotate the engine and stopping fuel flow to the engine in the first mode.

8. The method of claim 7, further comprising increasing engine air flow in the first mode.

9. The method of claim 8, further comprising decreasing engine air flow after the catalyst temperature is reduced to less than a the catalyst lower threshold temperature.

10. The method of claim 7, further comprising reactivating fuel flow to the engine in response to a driver demand torque and reducing engine air flow in response to a driveline integrated starter/alternator having capacity to provide the driver demand torque.

11. A hybrid vehicle system, comprising:
an engine including an exhaust system having a catalyst;
a motor selectively coupled to the engine via a driveline disconnect clutch; and
a controller including non-transitory instructions executable to selectively stop the driveline disconnect clutch from opening in response to a state of the catalyst, and additional instructions to open the driveline disconnect clutch in response to a temperature of the catalyst being less than a threshold temperature.

12. The hybrid vehicle system of claim 11, further comprising additional instructions to cut-out fuel flow to the engine in response to driver demand torque being less than a threshold torque.

13. The hybrid vehicle system of claim 12, further comprising additional instructions to increase air flow through the engine in response to the state of the catalyst.

14. The hybrid vehicle system of claim 13, further comprising additional instructions to open the driveline disconnect clutch in response to a temperature of the catalyst being less than a threshold temperature.

15. The hybrid vehicle system of claim 11, further comprising additional instructions to reduce a temperature of the catalyst in response to a capacity of a driveline integrated starter/generator to provide a desired driver demand torque.

* * * * *